Dec. 29, 1942.  C. L. WATERHOUSE, JR  2,306,416
METAL BODY FOR AN AUTOMOBILE
Filed Jan. 17, 1941  8 Sheets-Sheet 1

Inventor
Charles L. Waterhouse Jr.
By Blackmore, Spencer & Flint
Attorneys

Dec. 29, 1942.  C. L. WATERHOUSE, JR  2,306,416
METAL BODY FOR AN AUTOMOBILE
Filed Jan. 17, 1941   8 Sheets-Sheet 2

Inventor
Charles L. Waterhouse Jr.
By Blackmore, Smith & Shirk
Attorneys

Dec. 29, 1942. C. L. WATERHOUSE, JR 2,306,416
METAL BODY FOR AN AUTOMOBILE
Filed Jan. 17, 1941   8 Sheets-Sheet 3

Inventor
Charles L. Waterhouse Jr.
By
Attorneys

Dec. 29, 1942.    C. L. WATERHOUSE, JR    2,306,416
METAL BODY FOR AN AUTOMOBILE
Filed Jan. 17, 1941    8 Sheets-Sheet 5

Inventor
Charles L. Waterhouse Jr.
By
Blackmore, Spencer & Flint
Attorneys

Dec. 29, 1942.  C. L. WATERHOUSE, JR  2,306,416
METAL BODY FOR AN AUTOMOBILE
Filed Jan. 17, 1941  8 Sheets-Sheet 7

Dec. 29, 1942. C. L. WATERHOUSE, JR 2,306,416
METAL BODY FOR AN AUTOMOBILE
Filed Jan. 17, 1941 8 Sheets-Sheet 8

Inventor
Charles L. Waterhouse Jr.
By
Blackmore, Spencer & Flint
Attorneys

Patented Dec. 29, 1942

2,306,416

UNITED STATES PATENT OFFICE 2,306,416

METAL BODY FOR AUTOMOBILES

Charles L. Waterhouse, Jr., Dearborn, Mich., assignor to General Motors Corporation, Detroit, Mich., a corporation of Delaware Application January 17, 1941, Serial No. 374,796

5 Claims. (Cl. 296—28)

This invention relates to metal automobile bodies.

The body is of the type which is self-sustaining and requires no chassis or underframe to support it. The bottom of the body has box-sectioned constructions formed along the sides thereof to give to the body a self-sustaining rigidity, enabling the elimination of the usual chassis.

The novelty of the construction resides in forming the body of a minimum number of metal parts with a view to reducing weight and cost, but at the same time retaining the strength. In reducing the weight of the body, the economy of the engine will be increased because there will be less dead weight to propel, and if a decrease in weight can be obtained with a retention of strength, it will enable the engine better to propel the load over the highways.

Another object of the invention is to have all welding surfaces projecting outwardly, particularly where there are abutting flanges, so that the parts to be welded together are readily and easily accessible to the welding tools.

Further objects of the invention relate to improvements in various details of construction.

Figure 1:
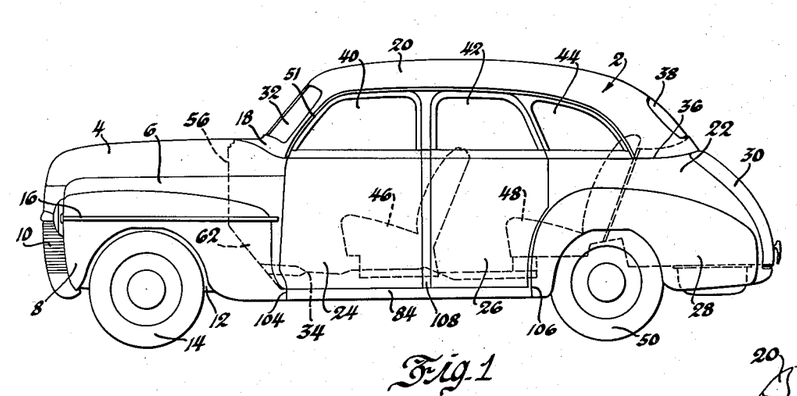
Figure 1 is a side view of the novel metal automobile body.

Referring to the drawings, the body as a whole is indicated at 2. The vehicle has the hood door 4, the hood side 6, the front fender 8, the radiator grille 10, and the pan or shield at 12 between the engine compartment and the front wheels 14. The front fender, if desired, may have a molding 16 extending the length thereof. The body itself comprises the cowl 18, the roof 20, the rear panel 22, front doors 24, rear doors 26, rear fenders 28, hinged door or lid 30 in the deck, a windshield 32, and an underpan 34. The roof slopes rearwardly and joins onto the rear panel at the line indicated at 36 and a back window 38 is provided in the roof. The doors have the usual windows 40 and 42, and the body is provided with the rear quarter window 44 in back of the rear door 26. The front seat is indicated at 46 and the rear seat at 48. The rear wheels are shown at 50.

The roof 20 has the front integral projections 51 which extend about halfway down the side of the windshield to form the upper half of a cap piece 170 later to be described. The lower part of the cap piece is formed integral with the cowl top, or may comprise a separate piece.

Figures 2, 3:
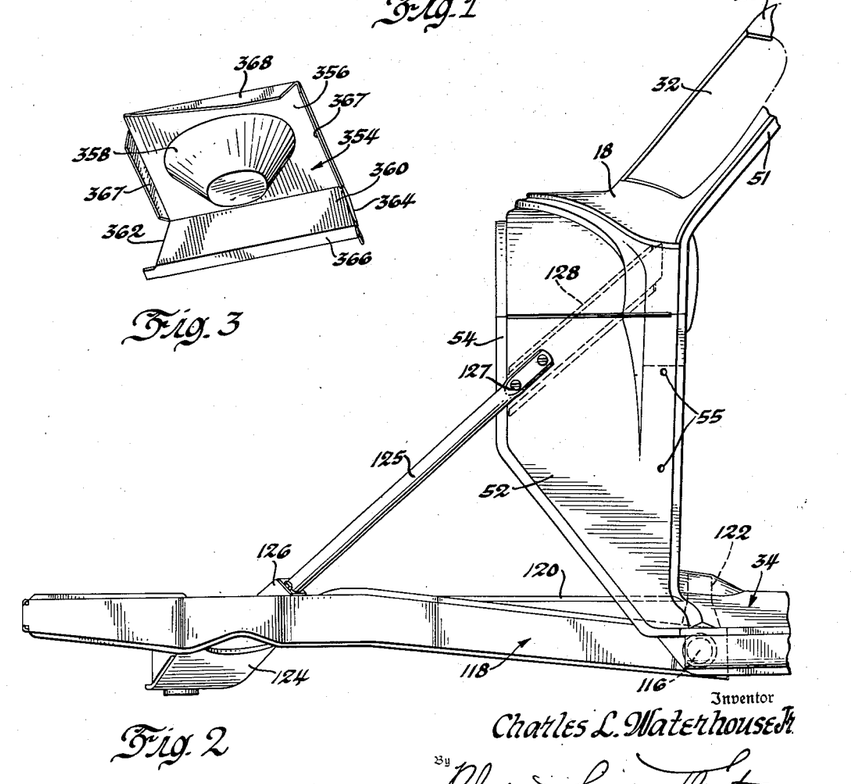
Figure 2 is an elevational detailed view of the cowl and the front frame showing the manner of joining the same.
Figure 3 is a perspective view of the spring seat or perch for the coil springs at the rear of the vehicle.

Referring to Figure 2, the cowl 18 has the sides 52, the front part of which is formed with a forwardly projecting flange 54. Openings 55 are for the purpose of attaching the hood side panel 6. The front end of the cowl is closed by a dashboard 56 which is provided with transverse reinforcing ribs 58 and has vertical reinforcing W-shaped irons 60 applied thereto at right angles to the ribs 58 to strengthen the cowl. The lower part of the dashboard 56 is inclined as indicated at 62 to form the toeboard of the vehicle. The edge of the dashboard 56 is provided with a flange 64 entirely therearound, and part of this flange mates with the flange 54 on the cowl and is secured thereto by welding. It is to be noted that the flanges 54 and 64 project outwardly or away from the body to render them readily accessible to the application of welding tools.

The toeboard 62 is preferably provided with the ribs 66 to strengthen the construction.

The lower flange 64 on the toeboard 62 mates with a flange 68 formed on the front end of the underpan 34, and these two flanges are united by welding and project away from the body in the same way as do flanges 64 and 54.

Figure 4:
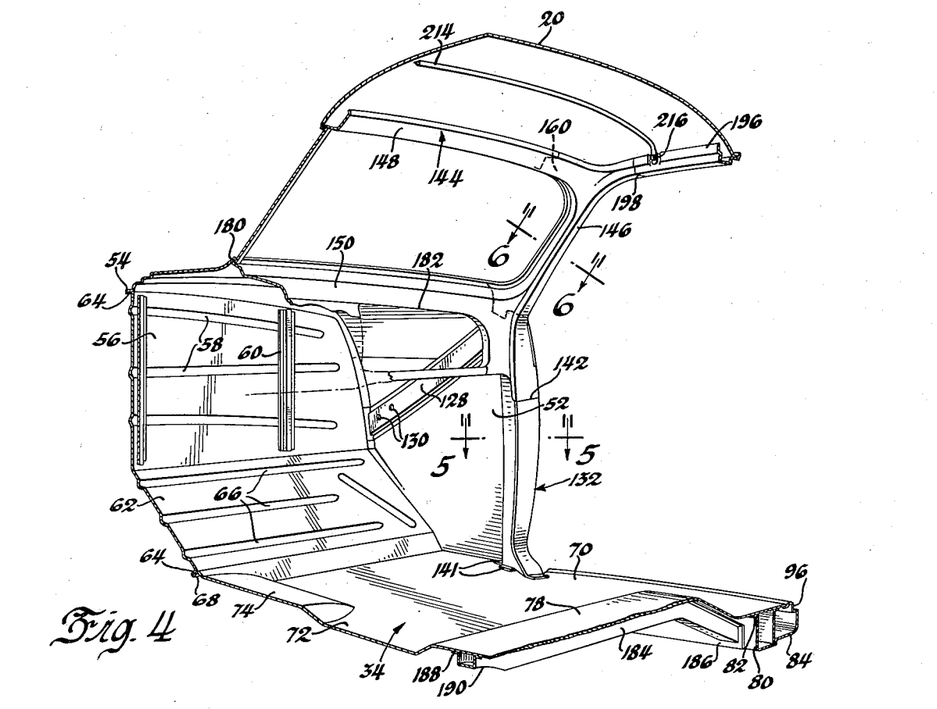
Figure 4 is an inside perspective view of the front part of the vehicle, parts being shown in section better to illustrate the construction.
Figure 5:
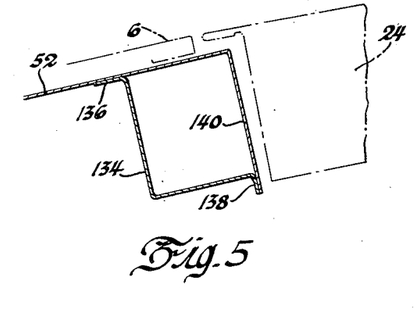
Figures 5 and 6 are sectional views on the corresponding lines of Figure 4.
Figures 18, 19, 20, 21:
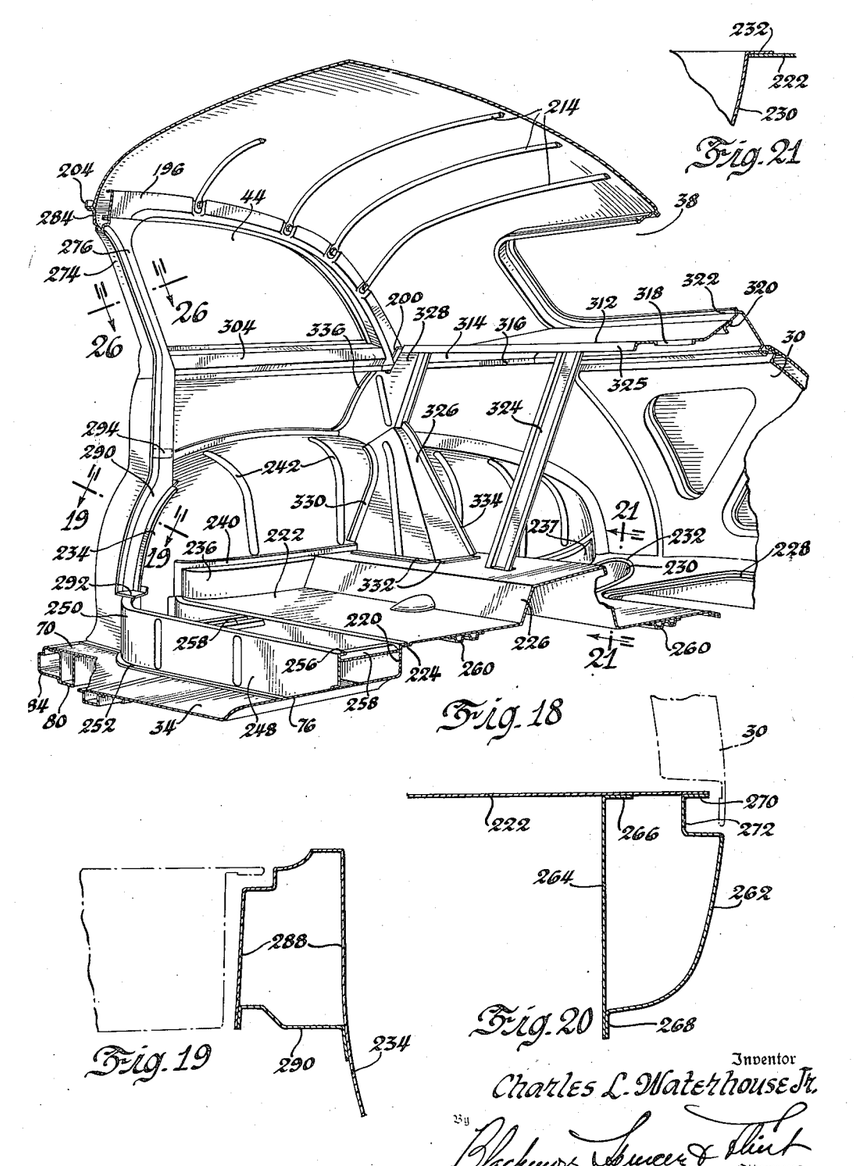
Figure 18 is an inside perspective view of the rear corner of the vehicle.
Figures 19, 21 and 26 are sections on the corresponding lines of Figure 18.
Figure 20 is a sectional detailed view on the corresponding line of Figure 22.
Figure 24:
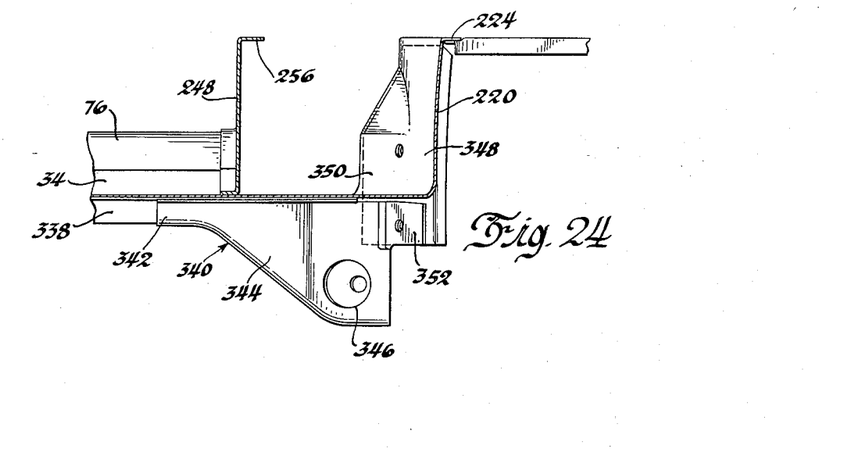
Figure 24 is a section on the corresponding line of Figure 22.

The underpan 34 extends from the end of the toeboard 62 to the extreme rear end of the vehicle as shown in Figures 18 and 24. In the passenger compartment, the underpan slopes upwardly from its outer edges 70 to its center 72 and at its center is formed into a channel the front part of which is indicated at 74, and the rear part at 76. Referring to Figure 4, the forwardmost part of the channel 74 fades out on substantially the intersection of a transverse line connecting the front door posts, and between the end of the channel 74 and a raised part 78 of the underpan under the front seat the floor does not have a pronounced channel but is crowned somewhat in order to provide ample space for the propeller shaft.

Figures 12, 13, 14:
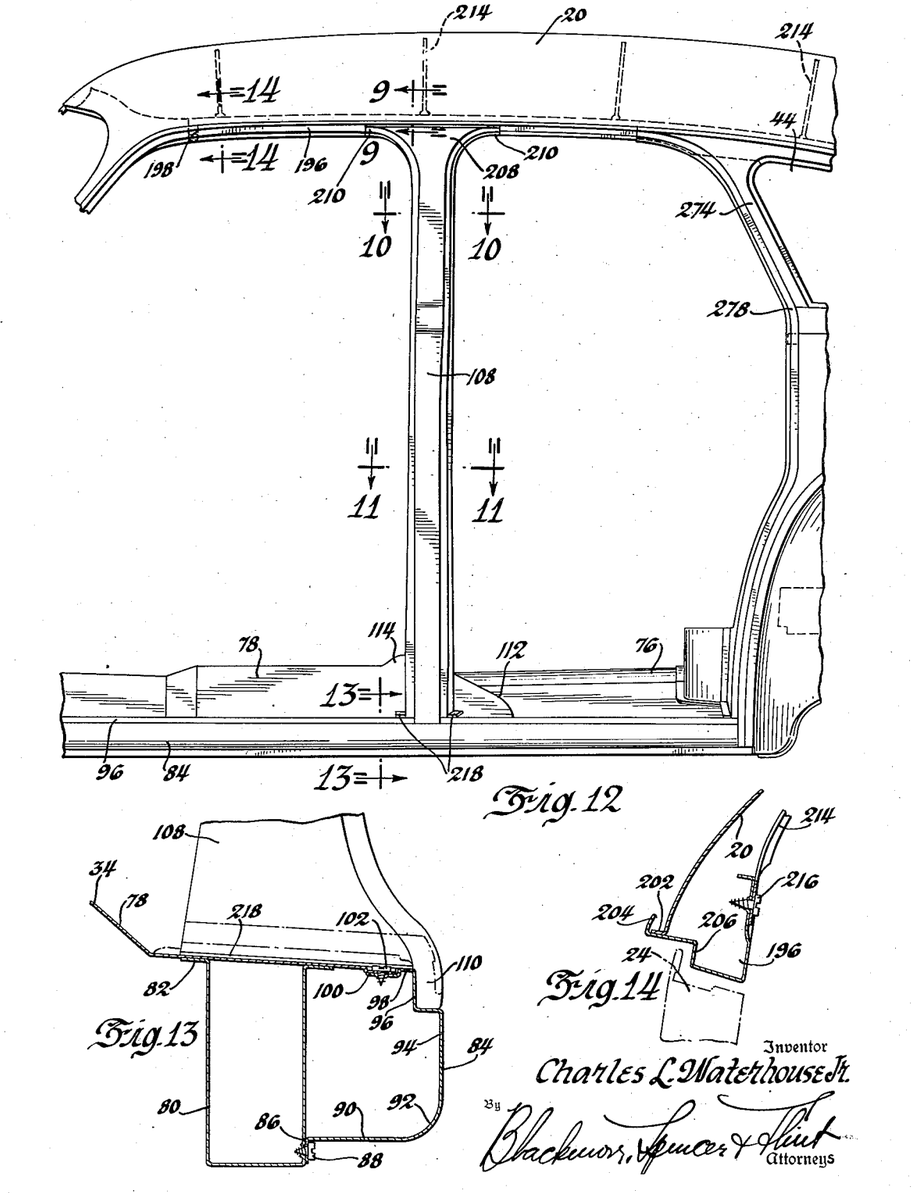
Figure 12 is an enlarged detailed view of the center part of the vehicle. The view of Figure 12 is a continuation of the view of Figure 2.

At the underside of the underpan 34 two U-shaped longitudinal channels 80 are provided, one channel at each side. These channels have laterally extending flanges 82 by means of which they are welded to the underside of the underpan. The channels 80 are positioned a short distance inward from the edge of the underpan, as is best seen in Figures 4 and 13, and in the corner provided between the channels 80 and the underpan a rocker panel 84 is secured to add strength to the construction, to give an exterior appearance to the car, and to provide a double box-sectioned construction. The rocker panel has the lower flange 86 secured such as by the screws 88 to the lower part of the channel 80. A horizontal flange 90 of the rocker panel extends away from the vehicle and is connected by a rounded part 92 to a vertical flange 94 which extends upwardly to the edge of the floor bottom 34. Just before it joins onto the floorboard, the rocker panel 84 is provided with a rabbet 96 to receive the lower overlap flange of the door. The rocker panel is then inwardly bent as at 98 and is joined to the extreme edge of the floor panel at 100 by means of the screws 102. The channels 80 and the rocker panels 84 extend from the flange 68, or from rear edge 104 of the front fender, to the upturned flange 220 of the underpan, or to the rear edge 106 of the rear fender 28.

The center door posts of the body are indicated at 108 and at the lower end the overlap part 110 fits into the rabbet 96. Between the posts the underpan is shaped, as shown at 112 in Figures 12 and 22, to form a footrest for the passengers occupying the rear seat 48. The rear side of part 112 is suitably inclined to accommodate it to the feet of the passengers. The forward end 114 of the shaped part 112 is considerably higher than the rear end and projects above the top of the raised part 78. This part 112 extends entirely across the vehicle and forms a large transverse rib to give added transverse strength to the underpan.

At its forward end the channels of the underpan are provided with connections at 116 which are substantially the same as the connection shown in Figure 5 of my copending application Serial No. 262,605, Metal body for motor vehicles, filed March 18, 1939. This connection joins the front end of the sills or channels 80 to a front frame 118. This frame comprises two Y-shaped elements 120 (Figure 23) connected at their rear ends by means of a transverse member 122 and at the front ends by a transverse member 124. The front transverse member 124 serves as a means to mount the front end independent coil spring suspension, which may be of the conventional type.

At substantially the place where the transverse member 124 joins onto the Y-shaped members 120, inclined braces 125 are united by a flexible joint at 126 (see my copending application, Serial No. 262,605) to the frame 118 and at their upper ends the braces are secured by means of the bolts 127 to the sides 52 of the cowl. Inside the cowl and in alignment with the braces 125, U-shaped reinforcing channels 128 are welded to the cowl sides. The bolts 127 pass through suitable openings 130 in the channels 128 so that the braces 125 and reinforcing channels 128 are continuations of each other.

Figure 6:
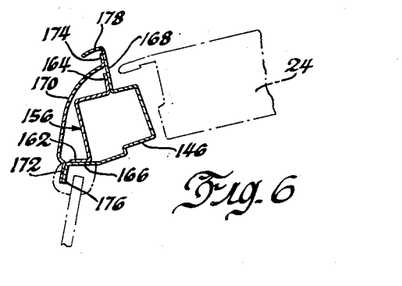
Figures 7, 8, 9:
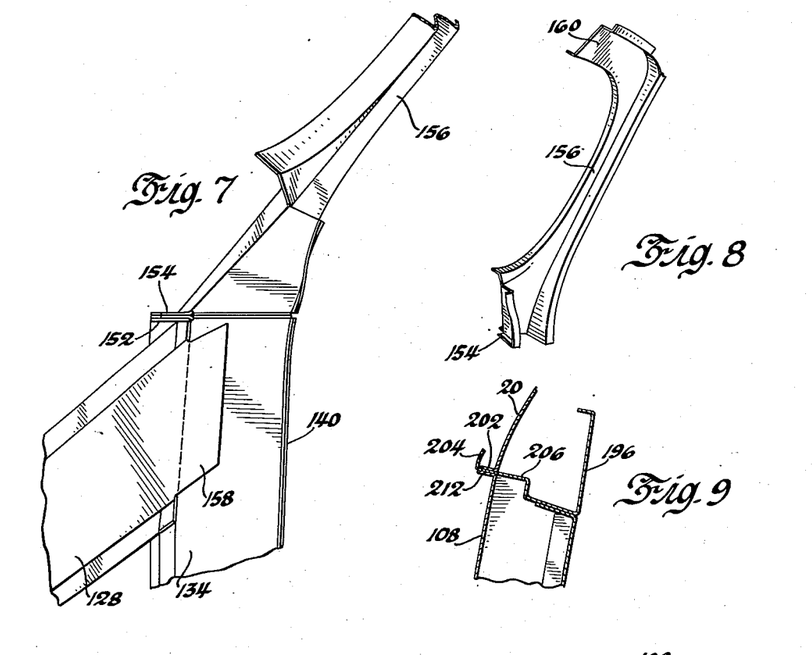
Figure 7 is a detailed view of the joint between the front door post, the windshield reinforcement, and the brace at the inside of the cowl.
Figure 8 is a detailed view in perspective of the reinforcing member inside the windshield at the front door pillar.
Figures 9, 10, 11, 13, and 14 are sections on the corresponding lines of Figure 12.

Referring to Figures 4–8 inclusive, the front door posts 132 at their lower end comprise the inner angle member 134 secured at one side by means of a flange 136 to the inside of the cowl 52 and at its other side secured by means of a flange 138 to the extremity of the inwardly bent flange 140 formed on the end of the cowl. Parts 134 and 140 are secured to the underpan by welding the flanges 141 thereto. This post formation continues up beyond the line 142 to the angle between the windshield and the cowl, and from the line 142 the inside of the post is formed by the sides of the inner windshield panel indicated as a whole at 144. This inner windshield panel comprises the lateral post members 146 (Figure 6), the upper transverse windshield header 148, and the lower transverse member 150 comprising the instrument panel. Parts 146, 148 and 150 are formed of a single sheet. Part 146 is inclined as shown in Figure 4 to conform to the inclined shape of the windshield 32 shown in Figure 1. The upper end of lower post parts 134 and 140 are outwardly flanged as indicated at 152 and these flanged parts join onto mating flanges 154 formed on an inner post and windshield reinforcement indicated as a whole at 156. As is best shown in Figure 7, the front inclined brace 128 of the cowl is also joined to the lower post member 134 of the front door post. This connection is formed by means of the flanges 158 and the connection is made by welding. The post member 156 extends upwardly beyond the top of the windshield opening and is inwardly turned as indicated at 160 to extend inside the space between the windshield header 148 and forward tip of the roof 20.

As is best shown in Figure 6, the reinforcement member 156 is united by means of an inner flange 162 and an outer flange 164 to the inner flange 166 and outer flange 168, respectively, of the channel shaped side of the post part 146 of the inner windshield panel 144. The reinforcing member 156 is angle shaped for the greater part of its length as shown in the sectional view of Figure 6 and with the windshield post part forms a box-sectioned construction.

The outer part of the front door post at the windshield is covered by the cap piece 170 which is provided with lateral flanges 172 and 174 which mate with the corresponding flanges 176 and 168 on part 146 and are secured thereto by welding. The cap piece 170 covers the windshield pillar reinforcement member 156.

The flange 168 has its end turned at substantially right angles as indicated at 178 to form with the edge of the cap piece 170 a rain drip trough.

The upper edge of the cowl at the windshield is provided with a flange which mates with a corresponding flange on the lower part of the inner windshield header, this construction being indicated by the numeral 180 in Figure 4. These two flanges are united by welding.

The instrument panel part 150 extends across the vehicle and is provided with the usual openings 182, one at each side, for a glove compartment or the placement of the usual instruments.

Beneath the underpan 34, under the front seat, and below the elevated part 78, a transverse channel reinforcing member 184 is provided. This channel member is joined at its side by means of the flanges 186 to the lateral reinforcing channels 80, and underneath the floor is united by the lateral flanges 188 to the underside of the underpan. This channel 184 has an arch 190 at its center part to provide clearance for the propeller shaft, the arch 190 forming a continuation of the channels 74 and 76.

Figure 10:
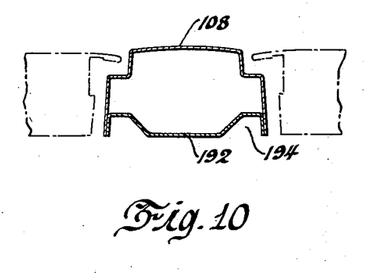
Figure 11:
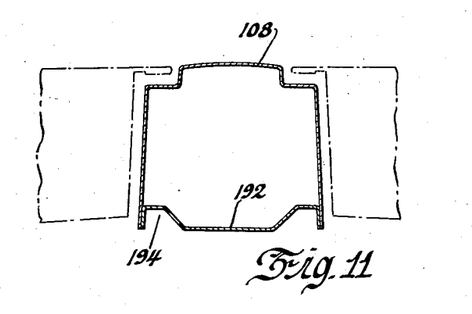

In Figures 10 and 11 there are shown sections through the upper and lower part of the center door post 108. These door posts are generally of channel formation and have the inner closure cap pieces 192 the edges of which, where they join onto the channel 108, being provided with longitudinal recesses 194 for the reception of tacking strips. The posts are wider at the bottom than at the top to form continuations of the bulged side of the car in order to give a widened or streamlined appearance.

In Figure 9 there is shown the manner in which the center post 108 is connected to the roof 20. Inside the roof at the edge thereof there is provided a reinforcing and bracing member 196, this member extending from the line of division 198 with the inner windshield panel to the rear panel 22 as shown by the dotted outline at 200 in Figure 15, and at 200 in Figure 18. The cross-sectional shape of member 196 is shown in Figure 9. It is secured at its edge to an outwardly bent flange 202 at the roof edge. The member 196 has its outer end upturned as indicated at 204 to form a rain drip trough, this member 204 being a continuation of the rain drip trough member 178 of Figure 6. The bottom of the member 196 is stepped as indicated at 206 and the upper part of the post 108 is likewise stepped to conform to the step 206. The post is splayed at its upper part as shown at 208 in Figure 12, and this splayed part terminates in the flanges 210 which are united to the underside of the stepped part 206. The post has the outwardly bent flange 212 which is secured to the stepped part 206 beneath the flange 202.

The lower end of the post 108 rests flatly upon the outside edge of the underpan 34 and is secured thereto by means of the outwardly turned flanges 218 as is best shown in Figures 12 and 13.

Referring to Figures 4, 12, 15, and 18, a suitable number of transverse upholstery retaining arched ribs 214 extend from side to side of the roof and at their ends are secured to the upturned flange of the reinforcing member 196 as shown at 216 in Figures 4, 14, and 18.

The interrelation of the upper part of the doors 24 or 26 with the roof is shown in Figure 14. The stepped part 206 forms a rabbet for the reception of the overlap flange of the top of the door.

Figures 22, 23:
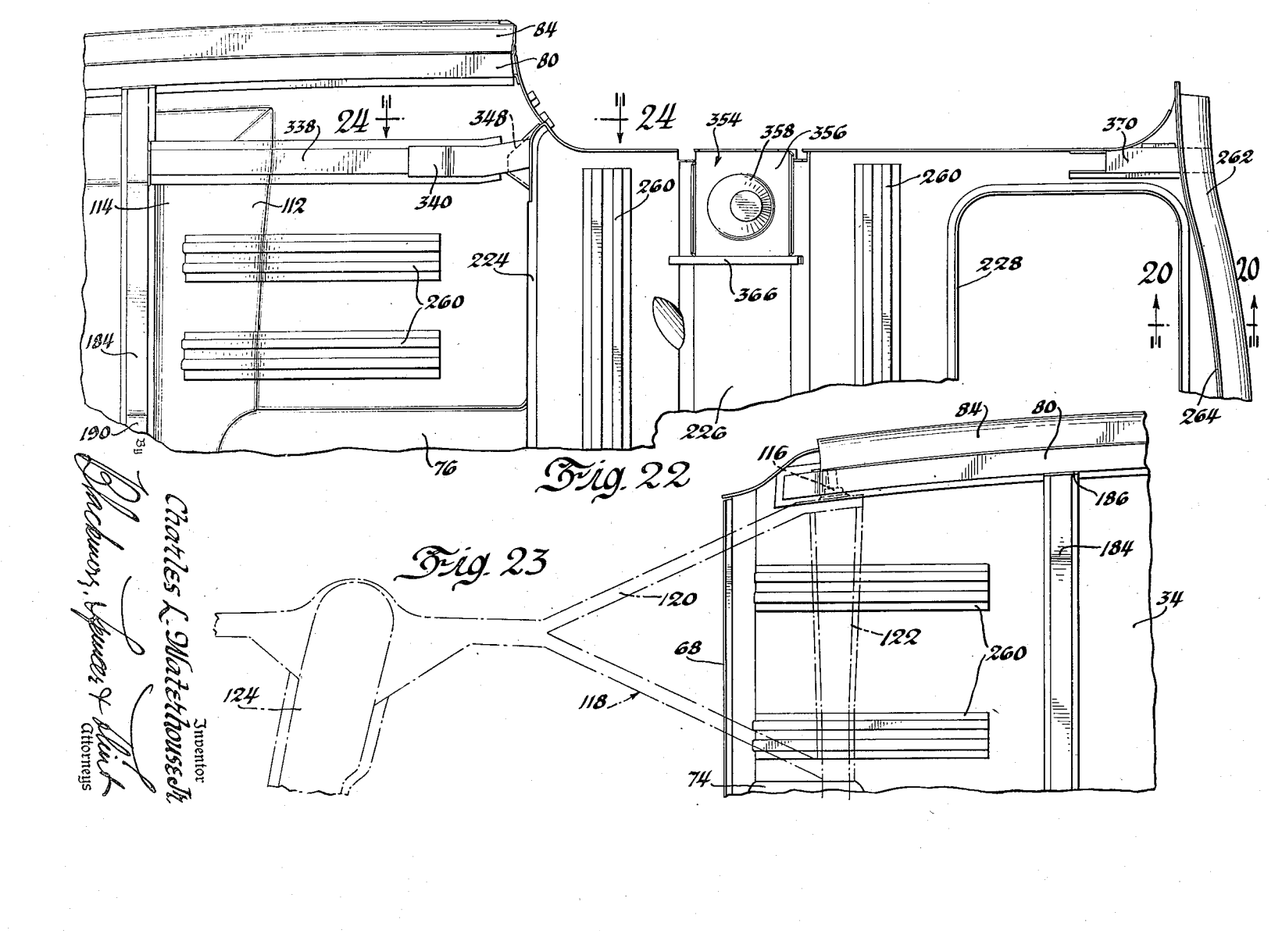
Figure 22 is a bottom plan view of half of the rear end of the underpan.
Figure 23 is a bottom plan view of half of the front of the underpan.

Referring to Figures 18 and 22, the rear end of the underpan is shown. The underpan is upwardly bent at 220 underneath the rear seat 48 and the rear part 222 of the underpan is formed separately but joined by welding to the front part at the mating flanges 224. Beyond the flanges 224 the rear part of the underpan has an upwardly directed channel 226 to form a clearance for the rear axle and differential, and at the rear flat part of the underpan there is formed an opening 228 for the reception of a gasoline tank and a second opening for the reception of a tub or pan 230 to form a well in which the spare tire is mounted. This tub or well 230 has the peripheral flange 232 (Figure 21) by means of which it is mounted to the edge of the opening in the rear part 222 of the underpan.

On the inside of the vehicle at the place where the underpan 34 joins onto the rear wheel housing 234 a reinforcing channel 236 is provided. This channel 236 extends from slightly above the place where the channels 80 and rocker panel 84 terminate to the rear tip of the vehicle as shown at 237. These channels have laterally extending flanges 240 which are welded to the wheelhouses 234. The channels are welded at their lower edges to the underpan. The channels 236 are interrupted at the edge of the upwardly directed channel 236 formed in the underpan to allow clearance for the rear axle.

The wheel housings are provided with suitable reinforcing ribs 242 to strengthen the construction. The wheel housings 234 form continuations of the rear panel 22 and are formed therewith in a single stamping. The wheel housings are provided with suitably shaped surfaces 244 provided with bolt openings 246 on which the surfaces 244 and the flanged edge of the rear fenders 28 are received and secured.

Immediately in front of the joint 224 of the underpan a transverse reinforcing member and seat support 248 is provided. This support 248 is rounded at its sides as indicated at 250 and secured to the rear door posts. The member 248 is provided with the lower flange 252 which is welded to the floorboard and at its upper edge with a flange 256 which is directed to the rear of the vehicle and adds strength to the construction. Suitable reinforcing and bracing members 258 extend between the flange 256 and the upturned part 220 at the rear part of the underpan 34.

Preferably W-shaped reinforcing members 260 are provided at suitable places along the length and width of the underpan to strengthen it. These W-shaped members have lateral flanges which are welded to the underside of the underpan.

In Figure 20 the extreme rear end of the underpan construction is shown. A transverse rocker panel 262 and an inner vertical plate 264 are provided. The plate 264 has the upper flange 266 welded to the underside of the underpan and the lower panel is provided with a flange 268 welded to the lower edge of the plate 264. The upper edge of the rocker panel 262 has a flange 270 secured to the underside of the underpan and adjacent the flange 270 a recess 272 is formed in the rocker panel. This recess is for the purpose of receiving a rubber or fabric sealing strip to form a weathertight connection for the rear deck door 30.

Figure 26:
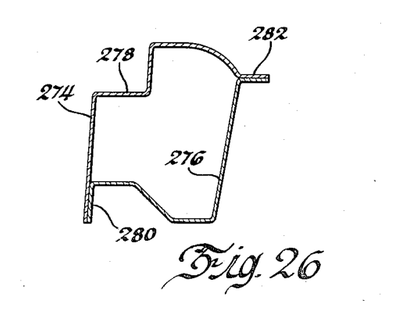

Referring to Figures 12, 18, 19, and 26, the structure of the rear door post is shown. At the rear quarter window the door post comprises the outer angle member 274 and the inner angle member 276 which are assembled as shown in Figure 26 to form a box-sectioned construction.

The usual rabbet 278 is provided to form a recess for the overlap flange of the door and the parts are united by welding at the overlapping flanges as shown at 280 and 282, the flanges being exterior to aid easy welding. The outer or cap part 278 of the rear post is a continuation or a part of the outer frame member 284 which extends entirely around the rear quarter window 44. Part 24 is formed in one piece and the line 286 in Figure 15, which appears to be a joint, is but an outwardly projecting part at the lower side of the piece 284. Below the rear quarter window the shape of the post is best shown in Figure 19 and comprises a channel shaped part 288 formed at the front edge of the wheelhousing 234, and an inner filler piece 290, the parts 288 and 290 forming a box-sectioned construction. Part 290 is united to the wheelhouse side 234 and to the wheelhouse channel 288 by flanges welded thereto. Part 290 extends from part 276 downwardly to the top of the transverse reinforcing member 250 where it is provided with the broad flat flange 292 which is secured to the flange 256 on the reinforcing member 250. The upper inner member 276 and the lower inner member 290 are united at the overlap as indicated at 294 in Figure 18.

Figure 16:
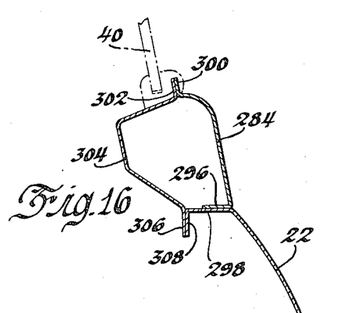
Figures 16 and 17 are sections on the corresponding lines of Figure 15.

Referring to Figure 16, the structure at the lower side of the rear quarter window is shown. The frame member 284 has a lower inturned flange 296 which mates with an inwardly turned flange 298 on the top of the rear quarter panel 22, the parts being secured by welding. Part 284 has an upwardly directed flange 300 at its upper edge which mates with a corresponding flange 302 on an inner channel member 304. The channel 304 has a lower flange 306 mating with a flange 308 downwardly turned from the flange 302. All of the flanges are united by welding to form the box-sectioned construction shown in Figure 16.

Figure 15:
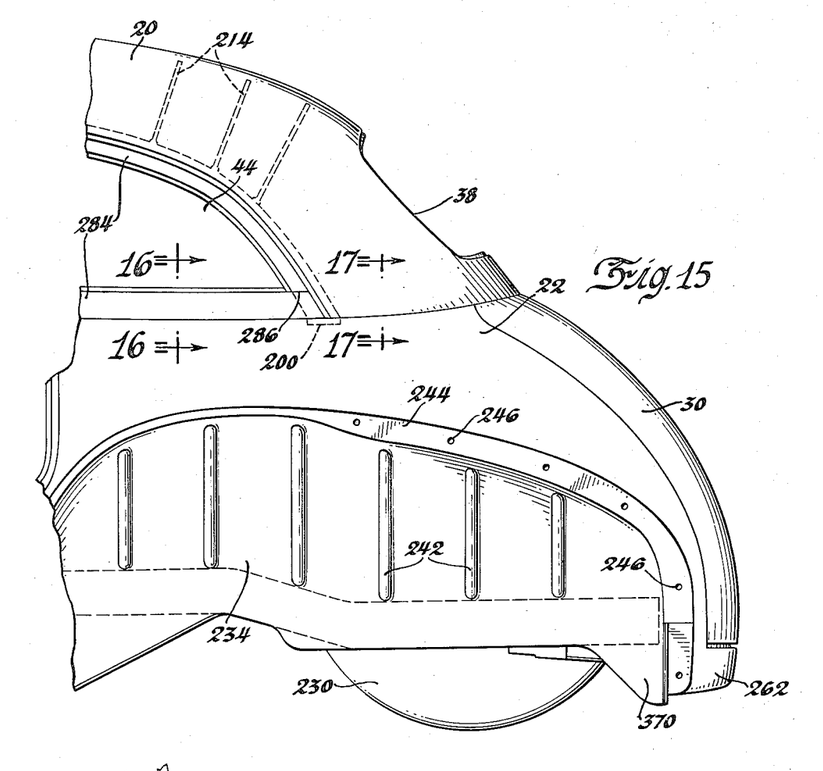
Figure 15 is a detailed view of the rear of the vehicle and a continuation of the right hand part of Figure 12.
Figure 17:
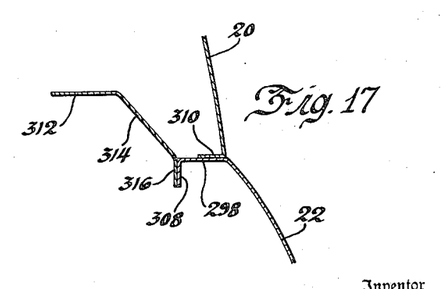

Referring to Figures 15 and 17, the manner in which the top 20 is secured to the rear quarter panel 22 is shown. The top has the edge flange 310 which mates with the flange 298 on the rear quarter panel and the two flanges are united by welding.

A package tray 312 extends transversely of the rear part of the vehicle. This tray has the lateral downwardly extending inclined edge part 314 which terminates in flange 316 mating with the flange 308 on the edge of the rear quarter panel 22. The flanges 308, 316 are united by welding. If desired, the package tray may be provided with suitable openings 318 to lighten the construction. The rear edge of the tray 318 is secured to the window frame member 320 of the rear window 38. This window frame member is provided with the edge flange 322 which is united by welding to an edge flange around the rear window opening 38.

The shelf 312 is supported transversely of its length by means of the channel shaped braces 324 which extend downwardly from an edge flange 325 on the shelf to the raised part or channel 226 of the underpan. The braces are secured to their abutting parts by welding. The braces 324 also form a support for the seat back of the rear seat.

To reinforce the construction at the top of the channel 226, the inner reinforcing members 326 and 328 are provided. The member 326 is angle shaped in cross section and has an edge flange 330, by means of which it is secured to the wheelhouse 234, and bottom flanges 232 by means of which it is secured to the top of the channel 226. An edge flange 334 adds strength to the construction. The flange 330 and the edge of the member 326 at the wheelhouse is shaped to conform to the curvature of the wheelhouse. The reinforcing member 328 is a continuation of the member 326 and extends upwardly to the shelf 312 and is secured to the flange 326. The member 328 has the edge flange 336 abutting against the inside of the rear quarter panel 22 and spaced therefrom by a strip of anti-squeak material. At its lower edge the member 328 is welded to the reinforcing member 326 and to the wheelhouse. If desired, parts 326 and 328 may be made in one piece.

Figure 25:
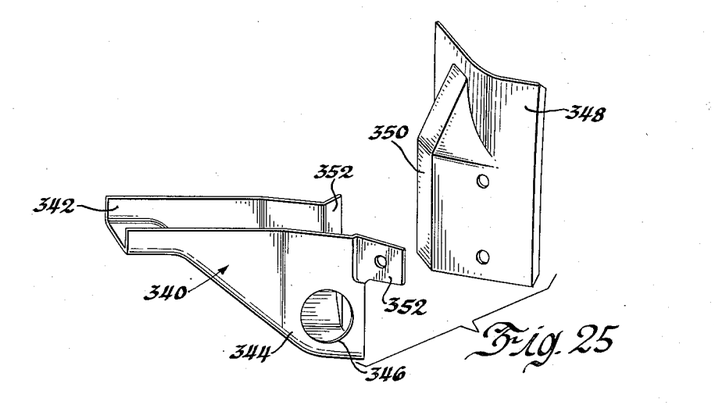
Figure 25 is an expanded view of the brackets shown in Figure 24.

Referring to Figure 22, the center part of the underpan is additionally reinforced at its sides by having welded thereto the channel members 338. These channels 338 are also secured at their front ends to the transverse channel shaped part 112 and the transverse brace 184. At the rear ends of the reinforcing channels 338 brackets 340 (Figures 24 and 25) are secured. Each bracket 340 has the front channel formation 342 which presses over the channel 338 and is secured thereto by welding. The rear part 344 is much deeper and extends downwardly a considerable distance below the channel 338 and is provided with an opening 346 which is for the purpose of the reception of a suitable pin or bolt which mounts one of the brace rods or radius rods for the rear coil spring suspension of the vehicle. The upstanding part 220 of the underpan has secured thereto at its outside a bracket 348, this bracket extending downwardly through an opening in the floor immediately above the bracket 340. The bracket 348 has a projection 350 which fits into a mouth of the bracket 340 reinforced by the flared flanges 352 on the rear end of the bracket 340. Parts 340 and 350 are secured together by welding or by bolting in any suitable way and serve to reinforce each other.

On the underside of the underpan and at the extreme ends of the channel 226 there are mounted coil spring seats or perches 354 (Figures 3 and 22). These perches have the flat base part 356 provided with a downwardly projecting cone 358 over which the coil spring is received. The base 356 fits on the flat bottom of the channel 226. The inner edge of the seat 354 has the downwardly extending flange 360, the edges 362 of which conform to the shape of the inclined sides of the channel 226 and are secured thereto by means of the edge flanges 364. A flange 366 at the end of the side 360 serves to strengthen the construction. The sides of the base 356 are provided with the edge flanges 367 which are secured to the inclined sides of the channel 226. An outer flange 368 on the outside edge of the perch serves to strengthen the construction. The positioning of the spring seats 354 at the ends of the channel 226 strengthen the underpan at these points and compensate for the interruption or break in the reinforcing channel 236.

At the extreme rear corner of the underpan, brackets 370 are secured to the underside thereof, these brackets serving as a means to mount the rear bumpers. The brackets 370 are preferably channel shaped and have edge flanges secured to the bottom of the underpan.

I claim:
1. In a metal automobile body, an underpan, a box-sectional construction at each side of the underpan, a raised section of the pan under the front seat of the body, a transverse brace under and abutting the pan at the raised part, said brace interconnecting the box sections, and an upwardly directed arch in the brace at the middle thereof to allow clearance for the propeller shaft.

2. In a metal automobile body, a rear panel extending from the rear door to the deck, a roof joining the panel at substantially the belt line of the vehicle, said panel and roof having a window opening therebetween, inner and outer rails at the lower edge of the window opening, said rails being united to the panel edge and to each other to form a box-sectioned construction.

3. In a metal automobile body, a rear panel extending from the rear door to the deck, a roof, said body having a window opening between the panel and the roof, a flange on the edge of the panel below the window opening, an outer rail at the window opening having a flange secured to the flange of the panel, an inner rail at the window opening having a flange secured to the flange of the panel, said rails being secured to each other to form a box-sectioned construction.

4. In a metal automobile body, an underpan extending substantially the length of the automobile, a channel formed in the rear part of said underpan to accommodate the rear axle and differential of the automobile, two wheel housings, one housing at each side of the channel and secured thereto, a channel secured to the wheel house and the underpan to form a box-sectioned reinforcing construction, two side panels, one panel at each side of the vehicle above the wheel housing and being secured thereto, two reinforcing members inside the body, one member at each side of the vehicle, said members being positioned on the channel and against the wheel housing and secured to both, and a second reinforcing member secured to the first member and to the wheel housing and panel.

5. In a metal automobile body, an underpan, channel reinforcing members secured under the pan and extending longitudinally thereof, an upwardly extending seat support formed in the pan, reinforcing brackets secured to the seat support in substantial alignment with the channels, projections from the brackets, a mounting bracket extending from the channels to the reinforcing brackets and secured to both, said mounting brackets having a downwardly extending part extending below the underpan and serving to mount the radius arms for the rear spring suspension.

CHARLES L. WATERHOUSE, Jr.